June 23, 1931.          K. L. HANSEN          1,811,672
ARC WELDING APPARATUS AND METHOD OF ARC WELDING
Filed Sept. 9, 1929
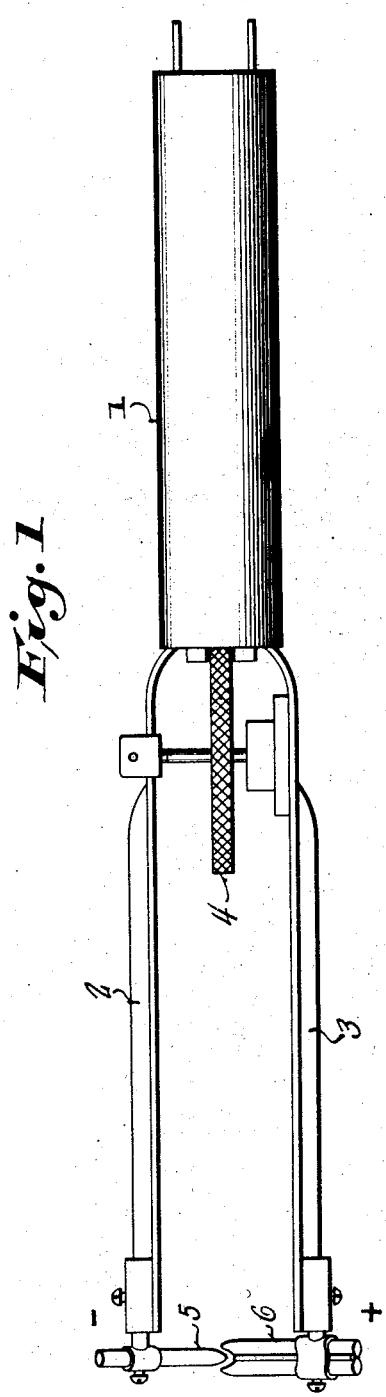
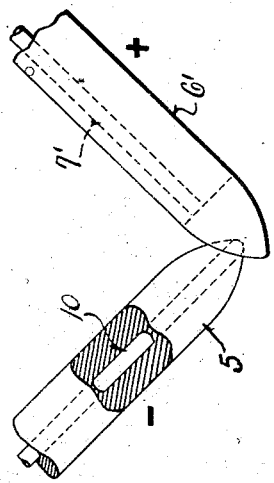
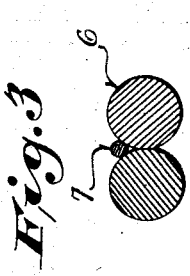
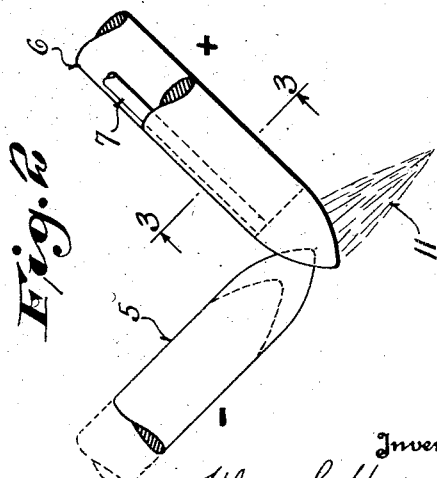
Inventor
Klaus L. Hansen
By Arthur R. Woolfolk
Attorney Patented June 23, 1931

1,811,672

UNITED STATES PATENT OFFICE

KLAUS L. HANSEN, OF MILWAUKEE, WISCONSIN

ARC WELDING APPARATUS AND METHOD OF ARC WELDING

Application filed September 9, 1929. Serial No. 391,253.

This invention relates to arc welding apparatus and to the method of arc welding.

In general this invention has the same objects as those discloesd in my prior application for arc welding apparatus and method of arc welding, Serial No. 298,494, filed August 9, 1928.

As in my prior invention disclosed in the application noted above, this invention contemplates the projecton of an arc flame past one electrode and the formation of a definite crater in such electrode which produces a neutralizing zone.

This invention is a step forward along the general lines disclosed in my prior invention above noted.

An object of this invention is to provide an arc welding apparatus in which the utmost concentration of the arc flame, and consequently of the heat, is obtained, so that the apparatus may be used in places where this extreme concentration of heat is necessary, as, for instance, in forming fillets in corners without melting any portion of the adjacent metal.

A further object of this invention is to provide an arc welding apparatus in which the relative adjustment of the electrodes may vary widely and still secure the great concentration of heat, so that an infrequent adjustment of the relative position of the electrodes is needed.

Further objects of this invention are to provide an arc welding apparatus which produces a less noisy flame and which produces a steadier flame, and which produces a reducing flame, as shown by spectrum analysis and in the type of work produced.

When welding certain metals, such, for example, as steel or other ferrous metals, the resulting weld, as made prior to my invention, has often been found brittle and having a burned appearance.

Further objects of this invention are to provide an arc welding apparatus in which welding on steel or other ferrous metals may easily be effected to produce a weld which is non-brittle and which is free from burning and which is more nearly of the nature of the original metal which is welded.

Further objects of this invention are to provide a novel method of arc welding in which the arc stream is projected past the positive electrode and an electrostatic neutralizing zone is obtained with a precise and definite crater formation, so that the utmost concentration of heat results.

Embodiments of the invention are shown in the accompanying drawings, in which:—

Figure 1 is a plane view of the holder showing the relative positions of the electrodes.

Figure 2 is an enlarged fragmentary end view of the sturcture shown in Figure 1, showing the relative position of the electrodes and showing approximately the relative position of the arc flame.

Figure 3 is a sectional view on a line 3—3 of Figure 2.

Figure 4 is a sectional view corresponding to Figure 3 showing one of the many forms that the positive electrode may take.

Figure 5 is a view corresponding to Figure 2 showing a modified form of the invention.

Any suitable type of holder may be employed, for instance, a holder similar to that disclosed in my above noted application which consists of a handle 1, a pair of movable arms 2 and 3, whose position is adjusted by means of a hand wheel 4 which may have a stem provided with a threaded end, as described in greater detail in my above noted application. The ends of the arms are provided with any suitable and preferably adjustable holders for carrying the negative electrode 5 and the positive electrode 6.

Referring particularly to Figures 2 and 3, it will be seen that the negative electrode may consist of a single carbon rod, whereas the positive electrode 6 is double bodied and has enlarged portions and a contracted center, as shown in cross section. Between these electrodes, and somewhat surrounded thereby, a metal rod 7 is positioned. This metal rod may be formed of any suitable material. For instance, aluminum has been found highly satisfactory.

Instead of having the positive electrode formed of two distinct carbon rods, it may be formed in various shapes, for instance, as indicated at 8 in Figure 4. This positive electrode is provided with a tin central portion and with enlarged outer portions. In other words, in all cases it has been found preferable, as shown in Figures 3 and 4, to form the positive electrode with a tinned center and enlarged spaced outer portions.

In the form shown in Figure 4, the same inventive idea is followed, as a metal rod 9 is positioned slightly nearer the top than the bottom and centrally of the carbon. It may be completely enclosed by the carbon or completely surrounded thereby, as shown in Figure 4, or it may be slightly exposed on its top, if desired, without departing from the spirit of this invention.

It is to be noted at this point that although metal rods, such, for instance, as aluminum, have been found highly satisfactory for producing a definite low resistance point in the crater, that nevertheless other relatively highly conducting materials could be used without departing from the spirit of this invention.

It may be found desirable in certain cases to provide the negative electrode with a more highly conducting central portion, for example as shown in Figure 5. In this form of the invention the negative electrode 5′ is provided with a metal rod 10 and the positive electrode 6′ is provided, similarly to the construction shown in Figures 1 to 3, with a metal rod 7′.

In using this apparatus it has been found that an extremely great concentration of the arc flame, and consequently of the heat, may be obtained by this apparatus. It has been found also that a definite low resistance point is formed in the crater of the positive carbon.

It is to be noted, particularly from Figure 2 and as described in my prior application, that the arc flame, as indicated by the reference character 11 in Figure 2, is projected past the positive electrode and at an angle thereto.

While the exact theory of operation of the apparatus may involve additional features to those briefly outlined in this application, it is believed, and has been shown by experiments, to be due to a neutralizing action produced by the peculiarly formed crater produced in the positive electrode so that a neutralizing action of the electrostatic attraction of the positive electrode is obtained, thereby allowing the arc flame to be projected through this neutralizing zone past the positive electrode by the repulsive field or action of the negative electrode.

It has been found also that a very great concentration of the arc flame and of heat is obtained by this construction. Further, it has been found that the adjustment for obtaining the relative positions of the electrodes is not critical. For example, the negative electrode 5, see Figure 2, may occupy widely different positions, as shown, for example, in the full and in the dotted line indication.

It has been found that the arc is extremely quiet and steady and that the utmost localization or concentration of heat is obtained and may be utilized in classes of work heretofore considered impossible in arc welding of this type.

It is intended that the term "core" be interpreted as applicable either to a rod of metal or other highly conducting material either embedded within the electrode or else partially surrounded by such electrode, such, for instance, as shown in the different forms of the invention. It is also intended that the term "core" be interpreted to cover either a solid rod or materials in powdered or other forms.

Although this invention has been described in considerable detail, it is to be understood that such description is intended as illustrative rather than limiting, as the invention may be variously embodied and is to be interpreted as claimed.

I claim:

1. An arc welding apparatus comprising a pair of electrodes between which the arc is formed, the positive electrode having two enlarged approximately parallel portions, and the negative electrode having its end substantially symmetrically located with respect to the enlarged portions of the positive electrode, the negative electrode being arranged at an angle to the axis of the positive electrode, the positive electrode having a core formed of a material of high conductivity and having a high affinity for oxygen.

2. An arc welding apparatus comprising a pair of electrodes between which the arc is formed, the positive electrode having two enlarged approximately parallel portions and having an aluminum core symmetrical with respect to said enlarged portions, the negative electrode having its end substantially symmetrically located with respect to the enlarged portions of the positive electrode and having its axis approximately passing through the end of said aluminum core, the negative electrode being arranged at an angle to the axis of the positive electrode.

3. An arc welding apparatus comprising a negative electrode and a positive electrode, said negative electrode having a smaller lateral dimension than said positive electrode, said positive electrode having a longitudinally extending portion thereof formed of a material having a high conductivity and a high affinity for oxygen, said positive electrode having ears approximately symmetrical with respect to said longitudinally extending portion, said negative electrode being approximately symmetrically located with respect to the ears of said positive electrode, and means for feeding said electrodes to maintain said ears and the relative position of said electrodes as they wear away.

4. An arc welding apparatus comprising a negative electrode, a positive electrode, said positive electrode having a cut-out end forming a pair of projecting ears, said positive electrode having a longitudinally extending portion formed of a material of high electrical conductivity, and having a high affinity for oxygen, said longitudinally extending portion having its end projecting approximately into said cut-out end of said positive electrode, a negative electrode symmetrically located with respect to said ears, and having its end in proximity to the cut-out end of said positive electrode, and means for feeding said electrodes to maintain the cut-out end and ears of said positive electrode.

5. The method of welding comprising striking an arc between two electrodes and projecting the arc past one of said electrodes and simultaneously fusing within said arc a material having a higher affinity for oxygen than the material of said electrodes between which said arc is struck.

In testimony whereof, the signature of the inventor is affixed hereto.

KLAUS L. HANSEN.